US007509785B2

(12) United States Patent
Fukumori et al.

(10) Patent No.: US 7,509,785 B2
(45) Date of Patent: Mar. 31, 2009

(54) ROLL-BALER

(75) Inventors: Kouichi Fukumori, Mie (JP); Akira Muraki, Mie (JP); Yuji Uemura, Mie (JP); Masanobu Okumura, Mie (JP); Nobuki Yamana, Saitama (JP); Hirokatsu Shito, Saitama (JP); Yukinori Shibuya, Saitama (JP)

(73) Assignees: Takakita Co. Ltd., Natsumi, Nabari, Mie (JP); Institute of Agricultural Machinery, Bio-oriented Technology Research Advancement Institution, Nisshin, Saitama, Saitama (JP)

( * ) Notice: Subject to any disclaimer, the term of this patent is extended or adjusted under 35 U.S.C. 154(b) by 476 days.

(21) Appl. No.: 10/207,807

(22) Filed: Jul. 31, 2002

(65) Prior Publication Data
US 2003/0093979 A1 May 22, 2003

(30) Foreign Application Priority Data
Nov. 19, 2001 (JP) ............................. 2001-352852

(51) Int. Cl.
*B65B 11/04* (2006.01)

(52) U.S. Cl. ............................. 53/211; 53/118; 53/203; 53/215; 53/587; 56/341

(58) Field of Classification Search .................. 53/399, 53/587, 589, 216, 203, 211, 118, 215; 100/87; 56/341
See application file for complete search history.

(56) References Cited

U.S. PATENT DOCUMENTS 2,017,971 A * 10/1935 Howard ...................... 198/732
3,722,197 A * 3/1973 Vermeer ...................... 56/341
3,826,354 A * 7/1974 Patz ............................. 198/534
3,910,178 A * 10/1975 Eggers et al. ................. 100/5
4,022,121 A * 5/1977 Crawford et al. ............. 100/29
4,078,733 A * 3/1978 Popiolek ..................... 241/200
4,169,347 A * 10/1979 Phillips ....................... 56/341
4,229,934 A * 10/1980 Berky ......................... 56/341
4,334,467 A * 6/1982 Nishibe et al. ............... 100/89
4,335,855 A * 6/1982 Staskal et al. ............... 239/654

(Continued)

FOREIGN PATENT DOCUMENTS

GB          2210824          * 6/1989

*Primary Examiner*—Christopher Harmon
(74) *Attorney, Agent, or Firm*—Browdy and Neimark, P.L.L.C.

(57) ABSTRACT

The present invention is concerned with a roll-baler of a construction, in which the rotational movement of its rear chamber of the bale chamber for its opening and closing is done smoothly, while its lock mechanism is designed to be simple, so that the bale-shaping material of a short length may be fed into the bale chamber 4 through its inlet port "a".

In this type of the roll-baler, the bale chamber 4 is mounted on the machine body 1 at its position, where the inlet port "a" of the bale chamber 4 is open frontward, and the terminal end part 3a of the transporting conveyor 3 is so made as to its conveying surface forming an inclined surface "c" which is downwardly slanted, the inclined surface "c" being disposed at a position to constitute a part of the peripheral wall of the bale chamber 4, in opposition to the lower half side of the peripheral surface of the roll bale R to be formed within the bale chamber at the place where the inlet port "a" of the bale chamber 4 is present.

5 Claims, 6 Drawing Sheets

U.S. PATENT DOCUMENTS

| | | | |
|---|---|---|---|
| 4,352,267 A * | 10/1982 | Mellinger | 56/341 |
| 4,375,187 A * | 3/1983 | Kluver et al. | 100/88 |
| 4,567,998 A * | 2/1986 | Cole et al. | 222/44 |
| 4,597,243 A * | 7/1986 | Honegger | 53/430 |
| 5,377,481 A * | 1/1995 | Sibley et al. | 56/341 |
| 5,638,749 A * | 6/1997 | Ansbjer et al. | 100/87 |
| 5,727,359 A * | 3/1998 | Rampp | 53/211 |
| 6,341,470 B1 * | 1/2002 | Lacey | 53/176 |
| 6,516,586 B1 * | 2/2003 | Wingert | 53/438 |
| 6,591,743 B2 * | 7/2003 | Deutsch et al. | 100/8 |
| 2001/0013214 A1 * | 8/2001 | Viaud | 53/116 |

\* cited by examiner

ROLL-BALER

BACKGROUND OF THE INVENTION a) Field of the Invention

This invention relates to improvement in roll-baler of a type, which conveys materials of short length, such as harvested and shredded farm product for fodder, or the like, into a bale chamber mounted on a machine frame to be shaped and packed into a roll-bale, wherein the machine body is not provided with a pick-up device for picking up the material for shaping such as harvested fodder product, etc., but, instead, there is mounted a hopper for receiving such fodder product to be shaped into the roll-bale, so as to receive into this hopper the fodder materials in short length, which have been harvested and shredded by a foliage harvester, and then the fodder product is gradually taken out of the bottom part of the hopper and fed into the bale chamber by way of a transporting conveyor to be formed into the roll-bale.

b) Description of Prior Arts

FIGS. 1 and 2 of the accompanying drawing in this application illustrate different configurations of roll-balers, which receive into the hopper the abovementioned shredded material for fodder in short length to be shaped into the roll-bale.

The first roll-baler A shown in FIG. 1 is in such a construction that a connecting rod 10 provided on the front end side of the machine body 1 is joined to a connecting hitch provided on the vehicle body of a towing car such as tractor, etc. to be pulled by such towing car, thereby constructing the roll-baler in a pulled-type configuration.

This towing type roll-baler A is of such construction that a hopper 2 for receiving materials of short length for shaping such as harvested and shredded fodder product is mounted on the upper surface of the front face side of the machine body 1; then a transporting conveyor 3 for moving the shaping material supplied from a discharge port 20 provided at the bottom part of the hopper 2 in the rearward direction of the machine body 1 is mounted at such a position that it may be inclined downwardly toward the rear direction; and a bale chamber 4 to shape and pack the material for shaping to be transported rearwardly by means of the conveyor 3 is mounted at the rear part of the machine body 1 with its position being downwardly inclined toward the rear direction, whereby the bale chamber 4 is made in a configuration of its receiving port "a" being upwardly inclined to become opened frontward, and the short fibrous material sent thereinto through the receiving port "a" may rotate circumferentially within the bale chamber 4 so as to suppress outflow of the fodder material from the receiving port "a" when the material returns to the receiving port; for making it possible, the contact surface between the front chamber 4a of the bale chamber 4 and the rear chamber 4b rotating backwardly with a pivotal axis S being made as the center may take a slant position with its upper end side being inclined rearward of the machine body. And, in an open-mouth harvesting on the outer surrounding of the field at the initial stage of the harvesting work, or an intermediate harvesting work in a large-scale field, supply of the shaping material to the hopper 2 mounted on the machine frame has been done as shown either in FIG. 3 or FIG. 4: that is to say, the material feeding in FIG. 3 is effected in such a manner that the material of short length for shaping such as fodder product, which has been cropped and shredded by the harvester H, mounted on a separate tractor T from the tractor for pulling the roll-baler A, and discharged from this harvester H is received by a bonnet wagon W to be mounted on the tractor T; and, as soon as a predetermined quantity of the crop has been accumulated, the bonnet wagon W is inverted, thereby enabling the shaping material to be thrown into the hopper 2 which is mounted on the machine frame 1 of the roll-baler A; or the material feeding in FIG. 4 is effected in such a manner that the material of short length for shaping, such as fodder product which has been cropped and shredded by the harvester, is placed in a loader bucket B provided in the tractor T, and this loader bucket B is positioned above the hopper 2, which is mounted on the machine body 1 of the roll-baler A, followed by opening the bottom of the loader bucket B to thereby throw the shaping material into the hopper 2. In the ordinary harvesting work, two different systems have been adopted, i.e., (1) a system of directly blowing into the hopper 2 the shaping material which has been cropped and shredded by the harvester H mounted on the lateral side of the tractor T for pulling the roll-baler A, and to be discharged therefrom; and (2) a system of blowing into the hopper 2 the shaping material which has been cropped and shredded by the harvester H mounted on the separate tractor T from the tractor for pulling the roll-baler A, and to be discharged therefrom, while the tractors are running together side by side.

The roll-baler A shown in FIG. 2 is of a self-travelling or crawling type, which is constructed with the machine body 1, on which the hopper 2, the transporting conveyor 3, and the bale chamber 4 are mounted. This machine body 1 is provided with a driving engine and a steering system Y to be actuated by the engine. On the front face side of the machine body 1, there is mounted the foliage harvester H, by which the material for shaping the roll-baler, as cropped and shredded, is caused to be thrown into the hopper 2.

In this self-travelling type roll-baler, too, the transporting conveyor 3 and bale chamber 4, which rearwardly convey the material of short length for bale shaping to be discharged from the discharge port 20 in the bottom part of the hopper 2 mounted on the machine body 1, are both mounted on the machine body 1 in their position of being downwardly inclined toward the rear direction.

Since the roll-baler A of the configuration, which is not equipped with the abovementioned pick-up device, but accommodates the material of short length for shaping the roll-baler, as cropped and shredded by the harvester, into the hopper 2 is primarily intended for the material of short length for shaping the fodder product, or the like, in its shredded form, it has a problem of being expensive in its manufacture, because, as already mentioned above, since the transporting conveyor 3 is downwardly slanted in the rear direction, and the bale chamber 4 is mounted on the machine body 1 at the position of its receiving port "a" being upwardly slanted in the forward direction, if and when the rear chamber 4b of the bale chamber 4 is caused to be rotated toward the front chamber 4a for its closing, on the center of a pivotal axis S, the closing motion becomes stiff to make it difficult to shut, while its opening motion becomes smooth and easy. As the consequence, the lock mechanism must be made more intensified or more complicated.

Also, there is another problem such that, since the hopper 2 for receiving the material of short length for the roll-baler shaping is made to have a certain definite volume, if and when the shaping material as harvested by the circular cutting system, at the time of the mouth-opening work, where the fodder product or the like shaping material is harvested by means of the foliage harvester H, is loaded on the bonnet wagon W or the loader bucket B, which is then thrown into the hopper 2 of the roll-baler A at its fixed position, it becomes impossible to charge its total quantity at one time, owing to shortage of the volume capacity of the hopper 2, on account of which the material feeding becomes intermittent or batch-wise to deteriorate the working efficiency.

From what has been described above, there is still other problem such that, unless the roll-baler is attached at the back of the tractor machine body so as to be pulled by it, no efficient work can be secured in the "one-man" controlled operation.

There is still further problem such that a bridging phenomenon is generated within the hopper 2 to make it difficult to feed the shaping material as cropped and shredded into the bale chamber 4 at a certain definite quantity, if and when shaping material, which has been harvested and shredded by the foliage harvester, is thrown into the hopper 2 of the roll-baler A by means of the bonnet wagon, the loader bucket, and so forth, then the shaping material is sequentially discharged from the discharge port 20 of the hopper 2 to be forwarded into the inlet port "a" of the bale chamber 4 through the transporting conveyor 3.

SUMMARY OF THE INVENTION

The present invention has been made with a view to solving the afore-described various problems inherent in the conventional roll-balers, and has as its objective to provide a novel expedient capable of feeding the baler-shaping material of short length, as received in the hopper 2, into the bale chamber 4 through the inlet port "a" of the bale chamber 4 by way of the transporting conveyor 3, while making it possible to secure smooth rotational operations for opening and closing the rear chamber of the bale chamber, and yet with a simple structure of the lock mechanism.

With a view to attaining the abovementioned object of the present invention, there is provided an improved roll-baler, which comprises, as set forth in the appended claim 1: a hopper 2, a conveyor 3 for transporting bale-shaping material to be discharged from a discharge port 20 of said hopper 2, and a bale chamber 4 for receiving thereinto said bale-shaping material conveyed by said transporting conveyor 3 through an inlet port "a" to shape the same into the roll-baler, said component elements being all mounted on a machine body 1, wherein said bale chamber 4 is mounted on said machine body 1 at such position where said inlet port "a" for the bale shaping material is open to its frontward direction, while the terminal part 3a of said transporting conveyor 3 is so constructed as to having the conveying surface thereof formed an inclined surface "c" which is slanted downwardly toward the rear direction, said inclined surface "c" being mounted on said machine body 1 by disposing said terminal part 3a at a position which forms a part of the surrounding wall of said bale chamber 4, in confrontation to the lower half side of the roll-bale R to be formed within said bale chamber 4 at the location of the inlet port "a" of said bale chamber 4.

According to another aspect of the present invention, there is provided an improved roll-baler, which comprises, as set forth in the appended claim 2: a hopper 2, a conveyor 3 for transporting bale shaping material to be discharged from a discharge port 20 of said hopper 2, and a bale chamber 4 for receiving thereinto said bale shaping material conveyed by said transporting conveyor 3 through an inlet port "a" to shape the same into the roll-baler, said component elements being all mounted on a machine body 1, wherein said machine body 1 is formed in a traction-type by providing a connecting rod 10 which projects frontward of the front face side of the machine body, then mounting said hopper 2 to the front face side of said machine body 1, then mounting said transporting conveyor 3 in a manner to rearwardly sending the bale shaping material, and finally mounting said bale chamber 4 to the side of the rear part of said machine body 1 with said inlet port "a" facing the frontward direction; the front wall 2a of said hopper 2 being formed in a separate body with respect to the hopper main body 2b, the lower end part thereof being pivotally supported with a pivotal axis P, to which an actuator 5 is joined, said actuator being mounted on said machine body 1 in a manner to rotate slantendicularly in the front-to-rear direction with the pivotal axis P being made as the center by the actuation of said actuator; then a sliding wall 22, which overlappingly slides with the left and right side walls 21, 21 of said hopper main body 2b, is connected so as to increase and decrease the capacity of said hopper 2 by the rotation of the front wall 2a above said connecting rod 10.

According to other aspect of the present invention, there is provided an improved roll-baler, which comprises, as set forth in the appended claim 3: a hopper 2, a conveyor 3 for transporting bale shaping material to be discharged from a discharge port 20 of said hopper 2, and a bale chamber 4 for receiving thereinto said bale shaping material conveyed by said transporting conveyor 3 through an inlet port "a" to shape the same into the roll-baler, said component elements being all mounted on a machine body 1, wherein an agitator 6 to be driven for rotation is disposed within said hopper 2; a connecting-disconnecting mechanism for power transmission being provided on a gear mechanism to transmit the rotational power to rotational shaft 60 of said agitator 6, said connecting-disconnecting mechanism for power transmission being so controlled as to bring a twine or a net 70 for packing the roll-bale R, which has completed its shaping within the bale chamber 4, to the "on"-state due to stoppage of a delivery mechanism 7, thereby interrupting, for once, the actuation of said agitator 6 at the time of delivery of the twine or net 70.

The foregoing objects, other objects, as well as the specific construction and function of the roll-baler according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF THE PREFERRED EMBODIMENTS

Figure 1:
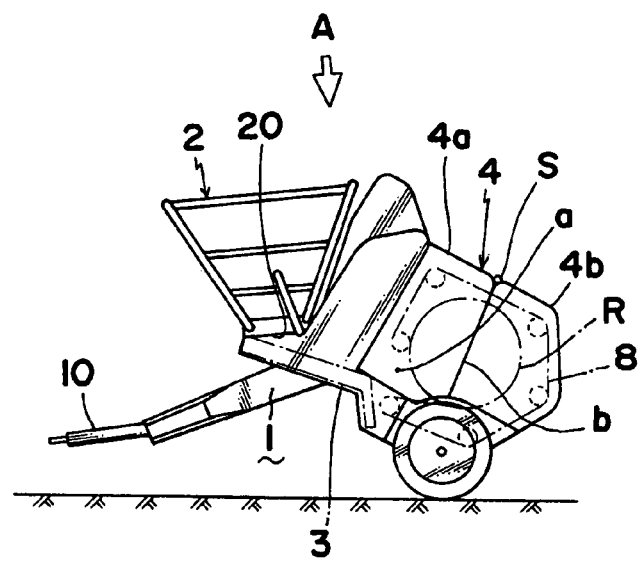
FIG. 1 is a side elevational view showing a conventional traction-type roll-baler.
Figure 2:
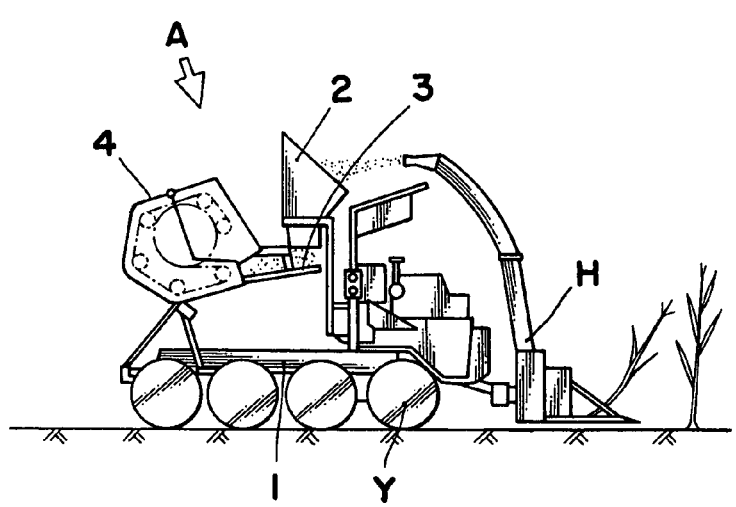
FIG. 2 is a side elevational view showing a conventional self-travelling or crawling type roll-baler.
Figure 3:
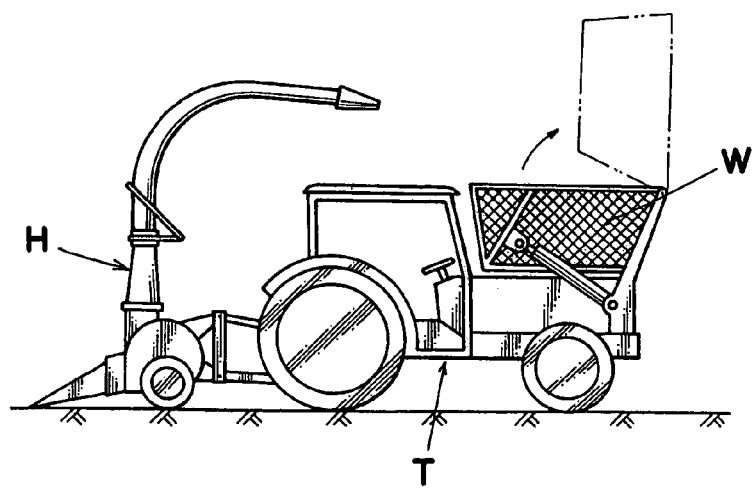
FIG. 3 is a side elevational view showing a rear-mounting type harvester and a bonnet wagon, both being joined to a tractor.
Figure 4:
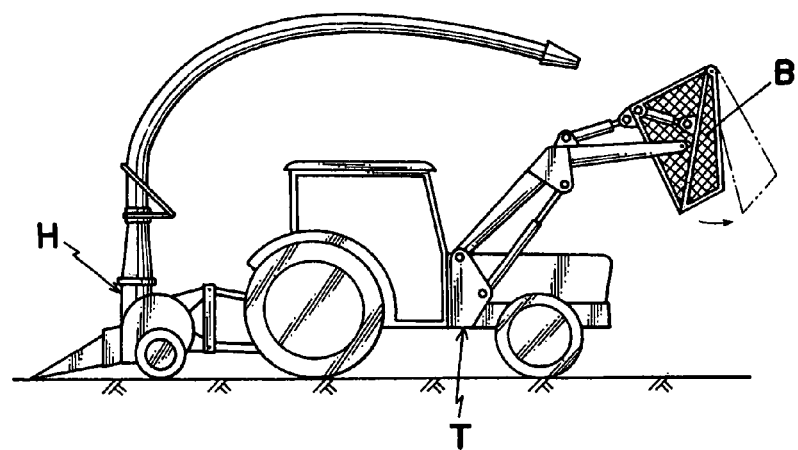
FIG. 4 is a side elevational view showing a rear-mounting type harvester and a loader bucket, both being joined to a tractor.

The roll baler A according to the present invention is constructed with a hopper 2 for receiving therein bale-shaping material of short length; a transporting conveyor 3 for rearwardly sending the bale-shaping material to be discharged from a discharge port 20 defined at the bottom part of the hopper 2; and a bale chamber 4 for receiving the bale-shaping material which is conveyed by the transporting conveyor 3 through a receiving port "a" to be shaped into a roll-bale; all these components being mounted on a machine body 1, wherein the front chamber 4a at the front half side of the bale chamber 4 is fixedly mounted on the machine body 1, while the rear chamber 4b at the rear half side of the bale chamber 4 is pivotally supported on the machine body 1, the hopper 2 being so designed that its content volume may become increased or decreased.

Figure 5:
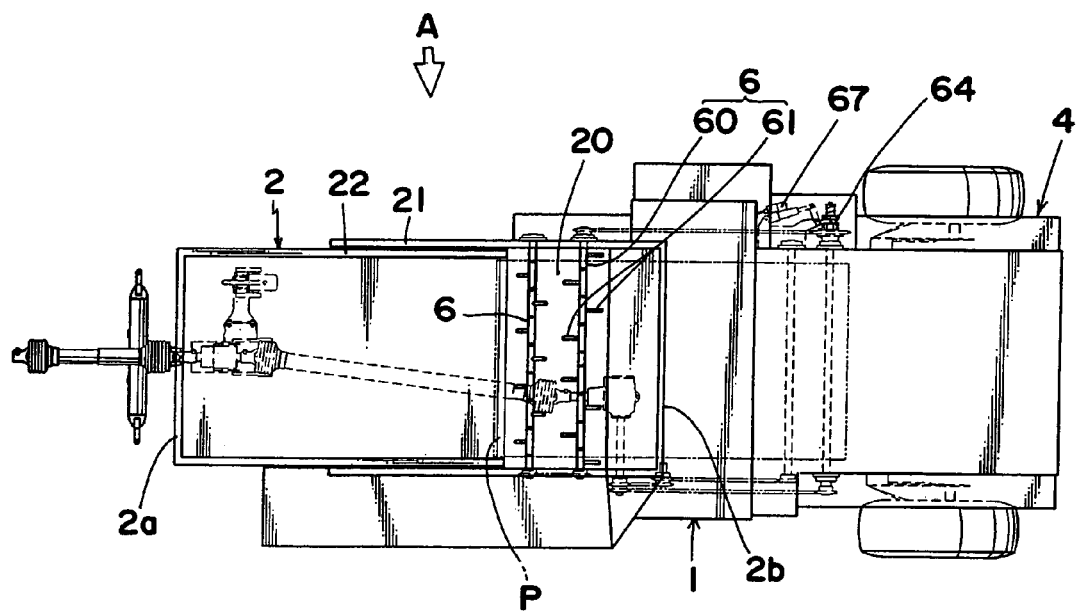
FIG. 5 is a plan view of the traction-type roll-baler, with which the concept of the present invention has been put into practice.
Figure 6:
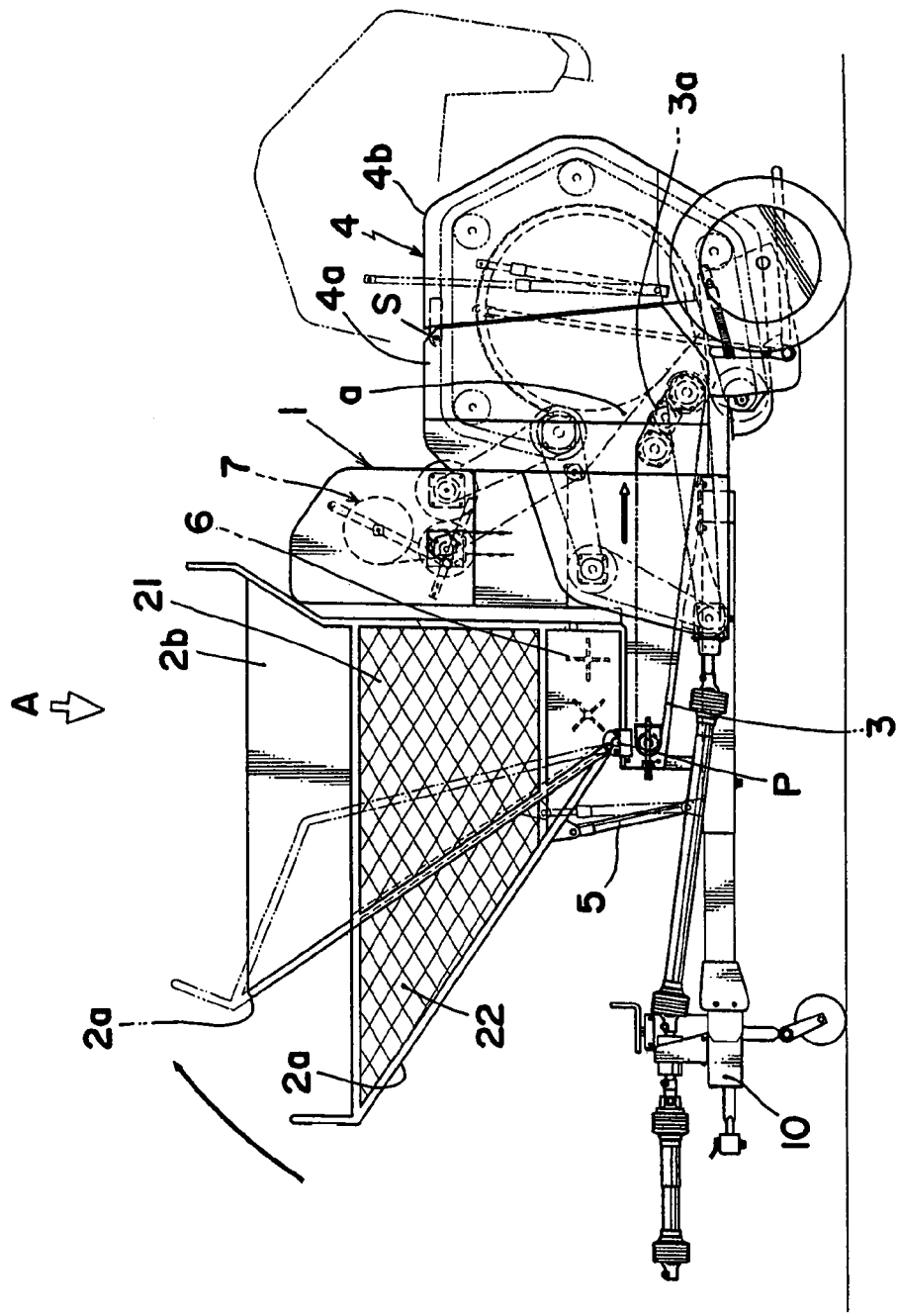
FIG. 6 is a side elevational view of the traction-type roll-baler, shown in FIG. 5.
Figure 7:
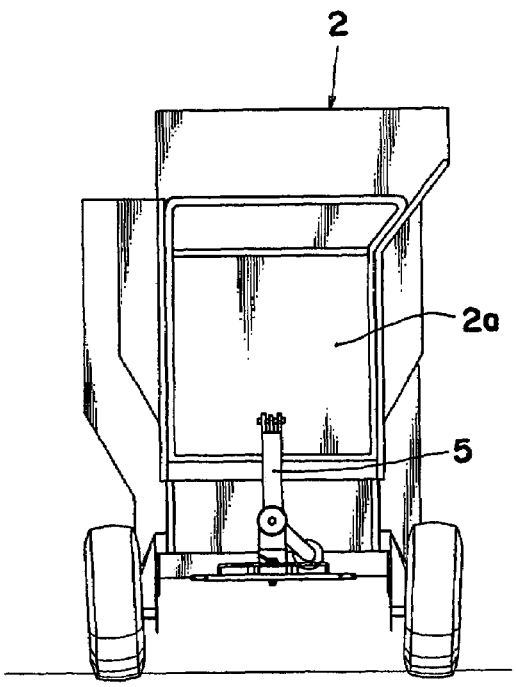
FIG. 7 is a front view of the traction-type roll-baler shown in FIG. 5.

This increase and decrease of the content volume of the hopper 2 can be expanded or shrinked, as in the embodiment shown in FIGS. 5 to 7, for example, by forming the front wall 2a of the hopper 2, separately from the hopper main body 2b, then pivotally supporting the lower end part thereof so as to be rotated slantendicularly in the front-and-back direction with a pivotal shaft P being provided on the machine body 1 as the center of rotation, while an actuator 5 such as hydraulic cylinder, etc. which telescopically moves between the machine body 1 and the front wall 2a; a slide wall 22 which overlaps with the left and right side walls 21, 21 of the hopper main body 2b is connected to the front wall 2a, whereby the actuator 5 works to rotate this front wall 2a back and forth between the state position as shown with the dash line as well as the solid line in FIG. 5, whereby the content volume can be expanded or shrinked by changing its width in the back and forth direction, which is effective for prevention of the bridging phenomenon to take place at the time of delivery of the bale-shaping material.

The device for increasing and decreasing the content volume of this hopper 2 is so constructed that, when the roll-baler A is made in a traction-type, wherein the connecting rod 10 provided on the front end side of the machine body 1 for the roll-baler, the rotation of the front wall 2a in the slanted direction for increasing and decreasing the content volume of the hopper 2 is effected by utilization of a space existing above the connecting part between the connecting rod 10 and the connecting hitch; and, moreover, since the lower wall 2a of the front wall 2a is slantendicularly rotated on the center of the supporting axis P at the lower side, it becomes possible to carry out changes in the increase and decrease of the content volume of the hopper, without giving no substantial influence on the operation of sequentially inducing the bale-shaping material as received therein to the discharge port 20 at the bottom part.

Also, at a position on the bottom part of the inner cavity of this hopper 2, and immediately above the discharge port 20, there is mounted an agitator 6, the agitating blades 61 of which rotate on the axis 60 as their center, so as to swingably agitate the bale-shaping material within the hopper 2 by its driving. In this case, while the bale-shaping material, which has been sent into the bale-chamber 4 is shaped to a predetermined size, and the delivery mechanism 7 for the twine or the net starts its operation to bale the rolled product, by the action of a pressure sensor for detecting a pressure value of the agitator, the driving of the agitator 6 temporarily interrupts the operation of this agitator until the rear chamber 4b is closed to stop feeding the bale-shaping material to the bale chamber 4, during which no excessive bale-shaping material may be sent into the bale chamber.

While the delivery mechanism 7 for delivering the twine or the net is in operation, the expedient for stopping the agitator operation until the rear chamber 4b is closed, may be so made as to operating the clutch mechanism, which is provided on the driving mechanism 7 of the rotational shaft of the agitator 6 when the delivery mechanism of the twine or the net starts its operation, by the bale-shaping material in the bale chamber 4 is shaped into a roll of a predetermined size, and by the pressure sensor performing the sensing operation of the predetermined pressure.

Figure 9:
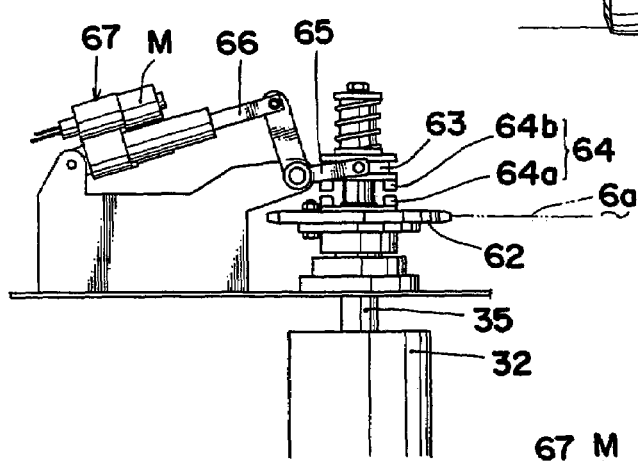
FIG. 9 is a plan view showing a state, wherein the connecting-disconnecting part for the rotational force of the agitator shown in FIG. 8 is in "off" condition.
Figure 10:
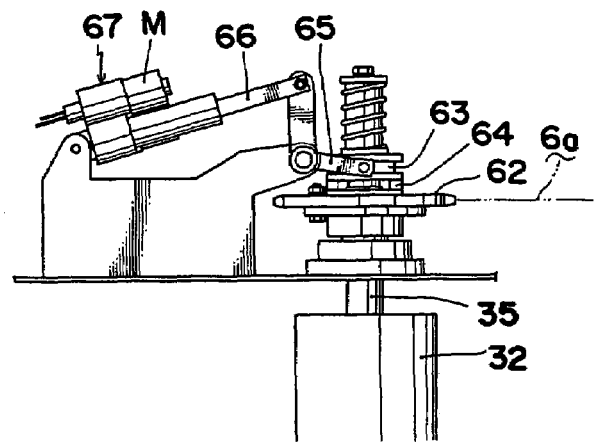
FIG. 10 is a plan view showing a state, wherein the connecting-disconnecting part for the rotational force of the agitator shown in FIG. 8 is in "on" condition.
Figure 8:
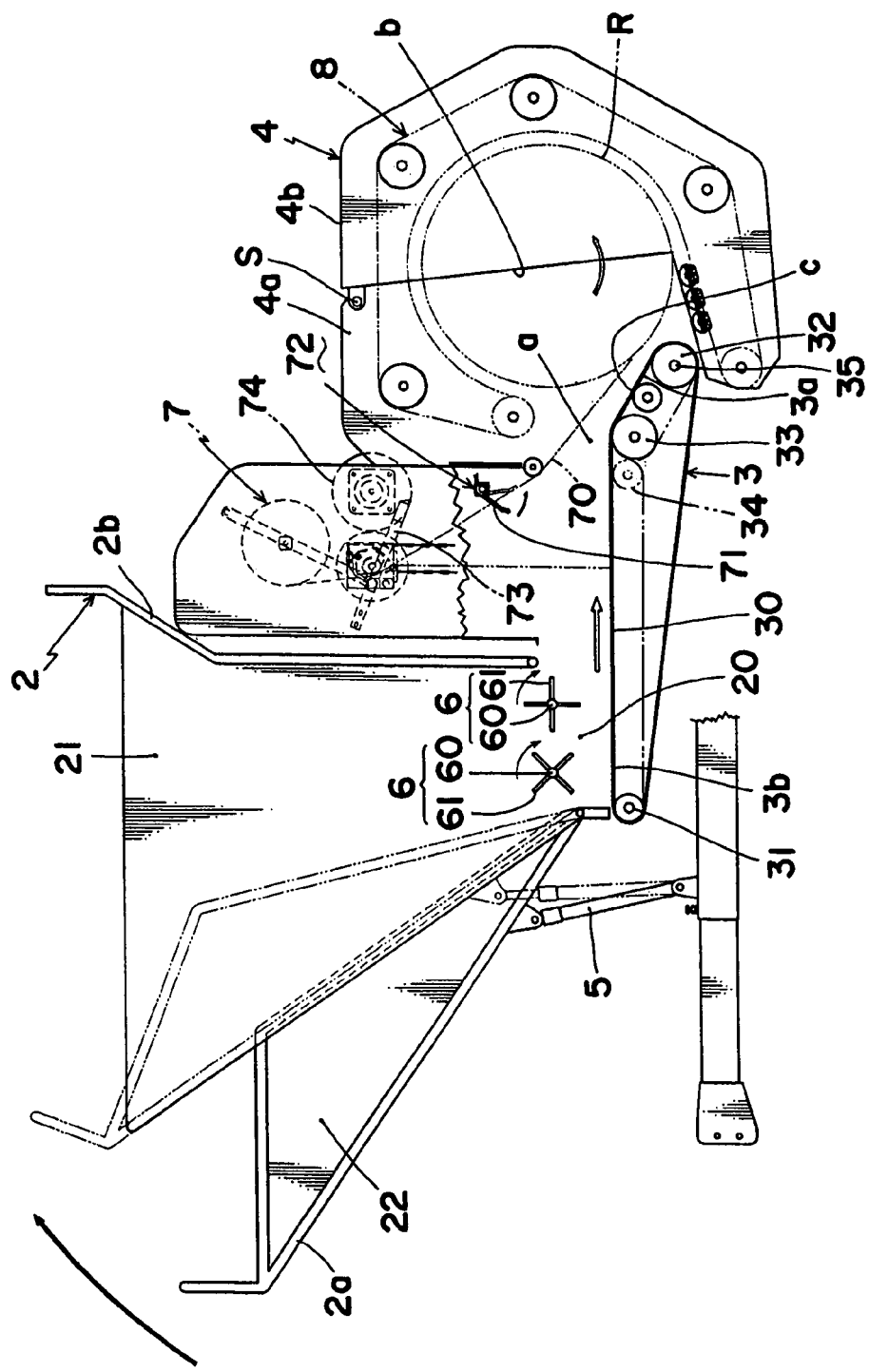
FIG. 8 is a side elevational view of the traction-type roll-baler shown in FIG. 5, with the main part thereof being partially cut away.

In this case, it is only sufficient that the clutch mechanism to be provided on the driving mechanism of the rotational shaft for the agitator 6 in association therewith may take its "off"-state, hence this mechanism may be arbitrarily constructed, In the embodiments shown in FIGS. 8, 9 and 10, the clutch mechanism 64 is constructed to render the on-off transmission of the rotational force to the rotational shaft 60 of the agitator 6, in such a manner that the rotational shaft 35 of the pulley 32 at the terminal end side of the transporting conveyor 3 is used as an input shaft of the transmission mechanism 6a to transmit the rotational force to the rotational shaft 60 of the agitator; then, to this rotational shaft 35, a power transmission gear 62 at the input side is mounted in a freely rotatable manner, while clutching teeth 64a are provided on the lateral surface of the transmission gear 62, then, at a position adjacent to the clutching teeth, a slider 63 to be engaged with the rotational shaft 35 in its rotational direction is mounted in a freely slidable manner in the axial direction; thereafter, another clutching teeth 64b to be meshed with the abovementioned clutching teeth 64a, in a freely engageable and disengageable manner are provided on the lateral surface which is opposed to the abovementioned power transmission gear 62; and, by sliding of the slider 63, the clutching teeth 64a and the clutching teeth 64b are caused to be engaged or disengaged each other. And, when the delivery mechanism 7 of the twine or the net 70 starts its operation by sensing action of the pressure detection sensor (not shown in the drawing), the actuator 67 functions to draw the rod 66 to cause the meshing clutch 64 to shift to its off-position, thereby maintaining rotation of the agitator 6 in its stoppage condition. After completion of winding the twine or the net 70 on and around the shaping roll, the rear chamber 4b is opened to release the roll-bale, immediately followed by closing the rear chamber 4b, the closure of which is sensed by the sensor, whereby the rod 66 of the actuator 67 is pushed out to transmit the power to the rotational shaft 60 of the agitator in the state of the drive shaft 35 and the power transmission gear 62 being connected each other, as shown in FIG. 10.

The bale chamber 4 to be mounted on the machine body 1 in such a manner that the bale-shaping material of short length, which is discharged from the discharge outlet at the bottom part of the hopper 2 and transported backward by the transporting conveyor 3 is constructed with the front chamber 4a to be fixedly mounted on the machine body 1 with an inlet port "a" being defined at the front surface side, and the rear chamber 4b to be rotated in an open manner toward the rear upward direction with a pivotal shaft S as its center, at the rear surface side, the bale chamber being mounted on the rear side of the machine body 1. In this case, it is feasible that the bale chamber may be mounted on the machine body 1 at its horizontal position, with its inlet port "a" being open to the front direction, as is the case with the bale chamber for the roll baler of a type, which shapes the bale shaping material of a long length, and which is equipped with an ordinary pick-up device.

Also, as shown in FIG. 8, the junction face "b", with which the opening at the rear surface side of the front chamber 4*a* and the opening at the front surface side of the rear chamber 4*b* are closed together for joining is so constructed that the junction surface may take a position, at which it is inclined rearwardly toward the downward direction, whereby the rotational motion for opening and closing of the rear chamber 4*b* with its pivotal shaft S being as the center, and also the lock mechanism for maintaining the state of closing rotation is made simple in its construction.

The transporting conveyor 3 which transports the bale-shaping material of a short length discharged from the outlet port 20 of the hopper 2, to the inlet port "a" of this bale chamber 4 is so constructed that the terminal part 3*a* in the conveying direction of the bale shaping material may assume a state of the terminal end part 3*a* being projected into the bale chamber 4 from the receiving port "a" thereof, and that the conveying surface of the terminal end part 3*a* thereof is inclined downward in the rearward direction to constitute the inclined surface "c" which is opposed to the lower half side of the peripheral surface of the roll bale R to be formed within the bale chamber 4, in a manner to clog the lower half side of the inlet port "a". As the consequence, when the bale shaping material of a short length fed into the bale chamber 4 through its receiving port "a" by means of the transporting conveyor 3 moves around the bale chamber interior and reaches its inlet port "a", the bale shaping material is again made to be sent into the bale chamber 4, while suppressing the material from overflowing from the inlet port "a" which is open toward the front surface.

In this way, the transporting conveyor 3 may either be substantially horizontal or slightly inclined downward in the rearward direction to a slight extent, in the space between the starting end part 3*b* of the hopper 2 facing to the lower surface side of the discharge port 20 and the terminal end part 3*a*.

From the above, the transporting conveyor 3 may be so constructed that, when its conveying belt 30 is endlessly extended between the pulley 31 at the side of the starting end and the pulley 32 at the side of the terminal end, the pulley 32 at the side of its terminal end is positioned to be within the bale chamber 4, at a level lower than the pulley 31 at the side of the starting end, and pivotally supported. Then, at an intermediate position between these two pulleys 31, 32, the intermediate portion of these pulleys 31, 32, the intermediate pulley 33 which supports middle part of the conveyor belt 30 is positioned at a height to be substantially leveled with the pulley 31 at the side of the starting end, followed by axially supporting the same, so that the conveyor belt 30 between this intermediate pulley 33 and the pulley 32 at the side of the terminal end may constitute the terminal end part 3*a* to form the inclined surface "c" which is inclined downward.

The terminal end side 3*a* of the transporting conveyor 3, which is so constructed as to projecting into the bale chamber 4 by the conveyor belt 30 between the intermediate pulley 33 and the pulley 32 at the side of the terminal end, can be made up, as a separate body from the conveyor belt 30 for delivering the bale-shaping material of a short length from the discharge port 20 of the hopper 2.

Figure 11:
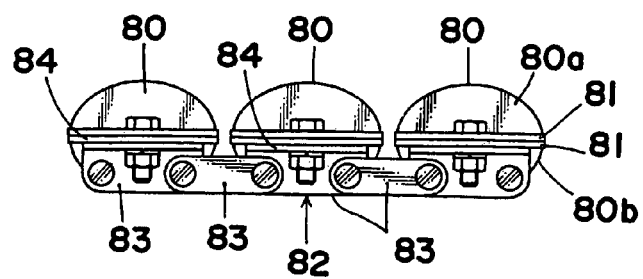
FIG. 11 is a side elevational view showing a tight-bar for the roll-baler.

In the next place, FIG. 11 is a side elevational view showing tight-bars 80, 80, . . . of a shaping device 8 to shape the bale-shaping material of short length received into the bale chamber 4 for the roll bale R, the tight bars R being extendingly mounted between a pair of tight bar driving chains for being extended on both left and right side walls of the bale chamber 4.

The tight bar 80 is formed in a slightly flattened tubular shape by closely joining an outer face member 80*a* and an inner face member 80*b*, each being made of steel plate in a semi-cylindrical form, the open face of which is provided with a flange 81 to be integrally welded together. By connecting a lug piece 84 provided on a ring plate 83 of a driving chain 82 of the tight bar 80 to the flange 81 at both end parts of the tight bar in its longitudinal direction, the space interval between the adjacent tight bars 80, 80 is brought to a state of being very narrow so as to prevent the bale-shaping material from escaping outside. Thus, a series of the tight bars are linked together in the form of a chain of band plate.

Figure 12:
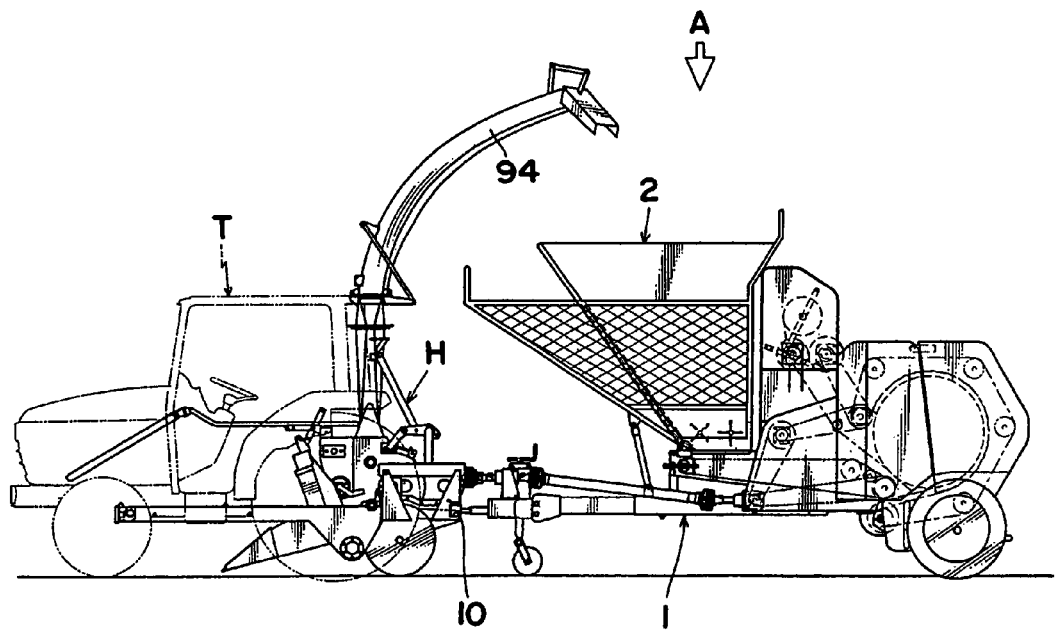
FIG. 12 is a plan view showing a state, wherein the harvester and the roll-baler are joined together.
Figure 13:
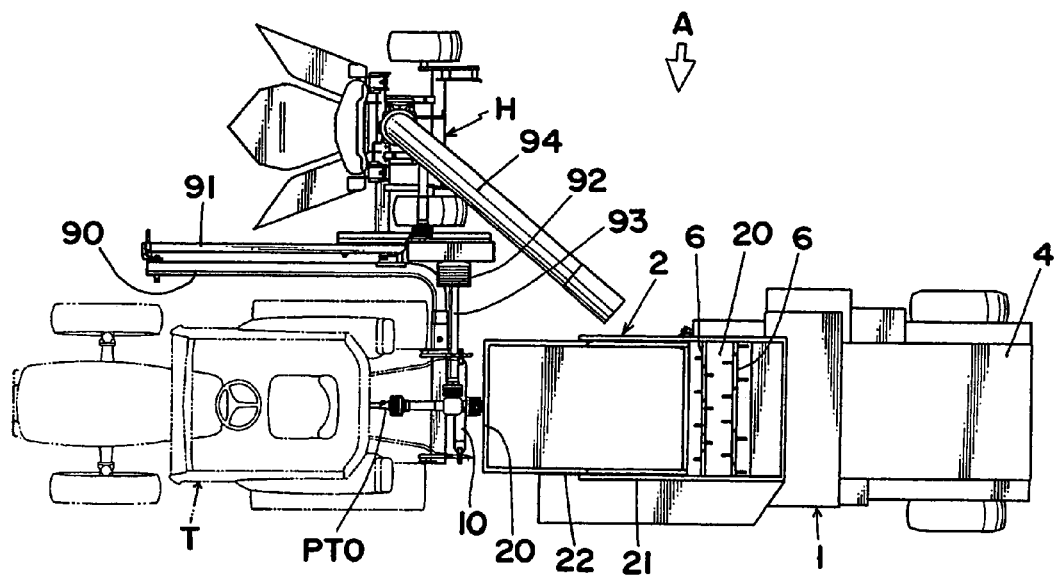
FIG. 13 is a side elevational view showing a state, wherein the harvester and the roll-baler are joined together.

In the next place, FIGS. 12 and 13 illustrate an embodiment, wherein the roll-baler A, in which the abovementioned means according to the present invention is put into practice, is combined with the harvester H so as to enable a one-man controlled operations of the device to be done.

In the embodiment shown, the roll-baler A is constructed in a traction-type, and the connecting rod 10 at the front end side of the machine body 1 is joined to a three-point link hitch provided at the rear surface side of the main body of a tractor T, so as to enable it to be pulled for its travel by the tractor T. Further, by providing a connector frame 90 at the lateral side of the tractor main body T, for connectively mounting the frame of the harvester H thereto, in such construction, it becomes possible to carry out the one-man controlled operations of: 1) cropping the bale-shaping material by means of the harvester H; 2) throwing the thus cropped and shredded bale-shaping material of a short length into the hopper 2 of the roll baler A; and 3) sequentially feeding the thus treated bale-shaping material into the bale chamber 4 of the roll baler A, so as to be shaped, packaged, and discharged out of the roll-baler.

In FIG. 12, a reference numeral 90 designates the connector frame, which is in a shape of a letter "L", when viewed in plan. The base end part thereof constituting a minor (or short) side runs along the rear surface of the tractor main body T, while a major (or long) side thereof extends forward along the lateral surface of the tractor main body T. In this arrangement, the short side is assembled to the tractor main body T to connect it fixedly to the main body.

To the projected end part of this connector frame 90 at its long side, there is joined a fitting lever 91 provided on the frame of the harvester H, this harvester H is assembled to be mounted on the lateral surface of the tractor main body T, and, by joining an input shaft 92 in the driving part of the tractor to the power takeout shaft PTO of the tractor T through a power transmission shaft 93, the harvester is caused to be driven by the power from the side of the tractor T.

Further, by bringing the tip end of a blow-off tube 94 for blowing the bale-shaping material from the harvester H, in its form as shredded, over the opening of the hopper 2 for the roll-baler A, at its top surface side, the bale-shaping material discharged from the blow-off tube 94 can be thrown into the hopper 2.

Furthermore, in the foregoing description, the roll-baler A according to the present invention has been explained as being constructed such that the machine body 1 is of the traction-type. It should however be understood that the machine body 1 may be constructed in a self-advancing (or crawling) type which can travel by itself, equipped with an engine and a travelling gear to be driven by the engine.

As has so far been explained in the foregoing, the roll-baler according to the present invention is so designed that the inclined surface "c" of the end terminal part 3a of the conveyor 3 forms a part of the peripheral wall of the bale chamber 4 to suppress overflow of the bale shaping material of short length which was received into the bale chamber through the receiving port "a", when the bale-shaping material moves around within the bale chamber 4 and returns to the receiving port "a". In this case, since the bale chamber 4 can be mounted at such a position where the receiving port "a" is open to the frontward direction, the rotational movement for opening and closing the rear chamber 4b can be done smoothly.

Also, since, by the swinging rotation of the front wall 2a of the hopper 2 in the back-and-forth direction, above the connecting rod 10 projectively provided in the frontward direction with respect to the front surface side of the machine body 1 so as to be joined to the traction vehicle, its content volume is increased or decreased, it becomes possible to perform expansion of the volume for receiving the bale-shaping material, as cropped by the circular cutting, prior to start of the machine operation, without giving conspicuous influence on the structure of the machine body 1 and its operation.

Moreover, when the roll bale R, which has been completed its shaping is to be packed by use of the twine or net 70 to be delivered by the operation of the delivery mechanism 7, since the driving of the agitator 6 to be provided within the hopper 2 can be interrupted, until such time when the delivery mechanism 7 starts its operation to close the rear chamber 4b, it becomes possible to stop the excessive quantity of the bale-shaping material to be fed into the bale chamber 4, at the time of packaging.

Although the present invention has been described in detail with reference to the specific mode of embodiments as shown in the accompanying drawing, it should be understood that the invention is not limited to these embodiments alone, but any changes and modifications may be made within the spirit and scope of the invention as recited in the appended claims.

What is claimed is:

1. An improved roll-baler, which comprises:

a hopper (2), a conveyor (3) transporting bale-shaping material from a discharge port (20) of said hopper (2), and a bale chamber {4} for receiving thereinto said bale shaping material conveyed by said transporting conveyor 3 through an inlet port "a" to shape the bale shaping material into a roll-bale, said hopper, conveyor and bale chamber all fixed on a machine body (1), wherein said bale chamber (4) is mounted on said machine body at a position where said inlet port "a" for the bale-shaping material is open to a frontward direction thereof, and an endless conveying belt (30) extending between a first pulley (31) at a pick-up end of said conveying belt (30) below said hopper and a second pulley at a terminal delivery end of the conveying belt (30) located within said bale chamber (4) at a height below that of said first pulley, wherein a third pulley (33) is located between the first pulley and the second pulley to support a first portion of said conveying belt between said first pulley and said third pulley to be substantially level and to support a second portion of said conveying belt (30) between the third pulley and the second pulley as an inclined surface "c" which is downwardly slanted toward a rear direction, wherein said inclined surface "c" is mounted on said machine body (1) by locating said terminal second portion at a position which forms a part of a surrounding wall of said bale chamber (4) in continuous engagement against a lower half side of the roll-bale when formed within said bale chamber 4 and wherein said inclined surface "c" discharges a complete roll-bale after an upper portion of said bale chamber is rotated up from said inclined surface "c".

2. An improved roll-baler according to claim 1, wherein said machine body (1) is constructed in a traction structure by providing a connecting rod (10) which projects frontward of a front face side of the machine body, said hopper (2) being mounted to the front face side of said machine body (1), said transporting conveyor (3) being mounted to the front face side of said machine body (1), and said transporting conveyor (3) being mounted to rearwardly send the bale-shaping material, and said bale chamber (4) being mounted to the rear side of said machine body (1) with said inlet port "a" facing the frontward direction;

the front wall (2a) of said hopper (2) being formed in a separate body with respect to the hopper main body (2b), the lower end part thereof being pivotally supported with a pivotal axis P, to which an actuator (5) is connected, said actuator being mounted on said machine body (1) in a manner to rotate slantendicularly in the front-to-rear direction with the pivotal axis P being made as the center by the actuation of said actuator; and a sliding wall (22), which slides overlappingly with the left and right side walls (21) of said hopper main body (2b), is connected to enable the capacity of said hopper (2) to increase and decrease by the rotation of the front wall (2a) above said connecting rod (10).

3. An improved roll-baler according to claim 1, wherein an agitator (6) to be driven for rotation is disposed within said hopper (2);

a connecting-disconnecting mechanism for power transmission being provided on a gearing mechanism to transmit the rotational power to the rotational shaft (60) of said agitator (6), said connecting-disconnecting mechanism for power transmission being so controlled as to bring a twine or a net (70) for packing the roll-bale R, which has completed its shaping within the bale chamber (4), to the on-state due to stoppage of a delivery mechanism (7), thereby interrupting, for once, the actuation of said agitator (6) at the time of delivery of the twine or net (70).

4. An improved roll-baler according to claim 1, wherein said first portion lies under said hopper and receives said bale shaping material from said discharge port (20) for transport into said bale chamber.

5. An improved roll-baler according to claim 1, wherein said conveyor comprises said endless conveyor belt (30) and said first, second and third pulley.

* * * * *